United States Patent [19]

Brickner, Jr. et al.

[11] Patent Number: 4,694,720
[45] Date of Patent: Sep. 22, 1987

[54] MITER BOX CONSTRUCTION

[75] Inventors: Louis C. Brickner, Jr., Pittsburgh, Pa.; Jerry D. Skipworth, Burkesville, Ky.

[73] Assignee: Delta International Machinery Corp., Pittsburgh, Pa.

[21] Appl. No.: 848,591

[22] Filed: Apr. 8, 1986

[51] Int. Cl.$^4$ ............................................. B27B 5/24
[52] U.S. Cl. ............................... 83/471.3; 83/490; 83/581; 144/286 R
[58] Field of Search ............ 83/574, 490, 581, 471.3; 144/379, 286 R, 286 A, 287

[56] References Cited

U.S. PATENT DOCUMENTS

| | | | |
|---|---|---|---|
| 2,201,658 | 5/1940 | Whitney | 83/490 X |
| 2,558,217 | 6/1951 | Hess et al. | 83/574 X |
| 2,911,017 | 11/1959 | Holder | 83/574 |
| 3,821,918 | 7/1974 | Niehaus et al. | 83/490 X |
| 3,994,192 | 11/1976 | Faig | 83/490 |
| 4,537,105 | 8/1985 | Bergler | 83/574 X |

Primary Examiner—Frank T. Yost
Attorney, Agent, or Firm—Merchant, Gould, Smith, Edell, Welter & Schmidt

[57] ABSTRACT

Method and apparatus for supporting a power tool, e.g., a power mitre box, are disclosed. In a preferred embodiment (10), an electrically-powered motor unit (16) is pivotably supported by a table (14) which in turn is rotatably supported by a base (12). The base (12) preferably includes four legs (20) and an equal number of studs (26). The legs (20) and studs (26) combine to form front slot (27a) and rear slot (27b) in the base (12) suitable for receiving a pair of horizontal support members, e.g., a pair of two-by-fours (34). The base (12) also preferably includes a pair of extensions (24) which are sized to make the top surface of the base (12) and table (14) flush with a plurality of cross pieces (36) spanning the horizontal support members (34). The flush surface created by the cross pieces (36), base (12) and table (14) is suitable for supporting a long workpiece so as to minimize blade binding and splintering.

24 Claims, 4 Drawing Figures

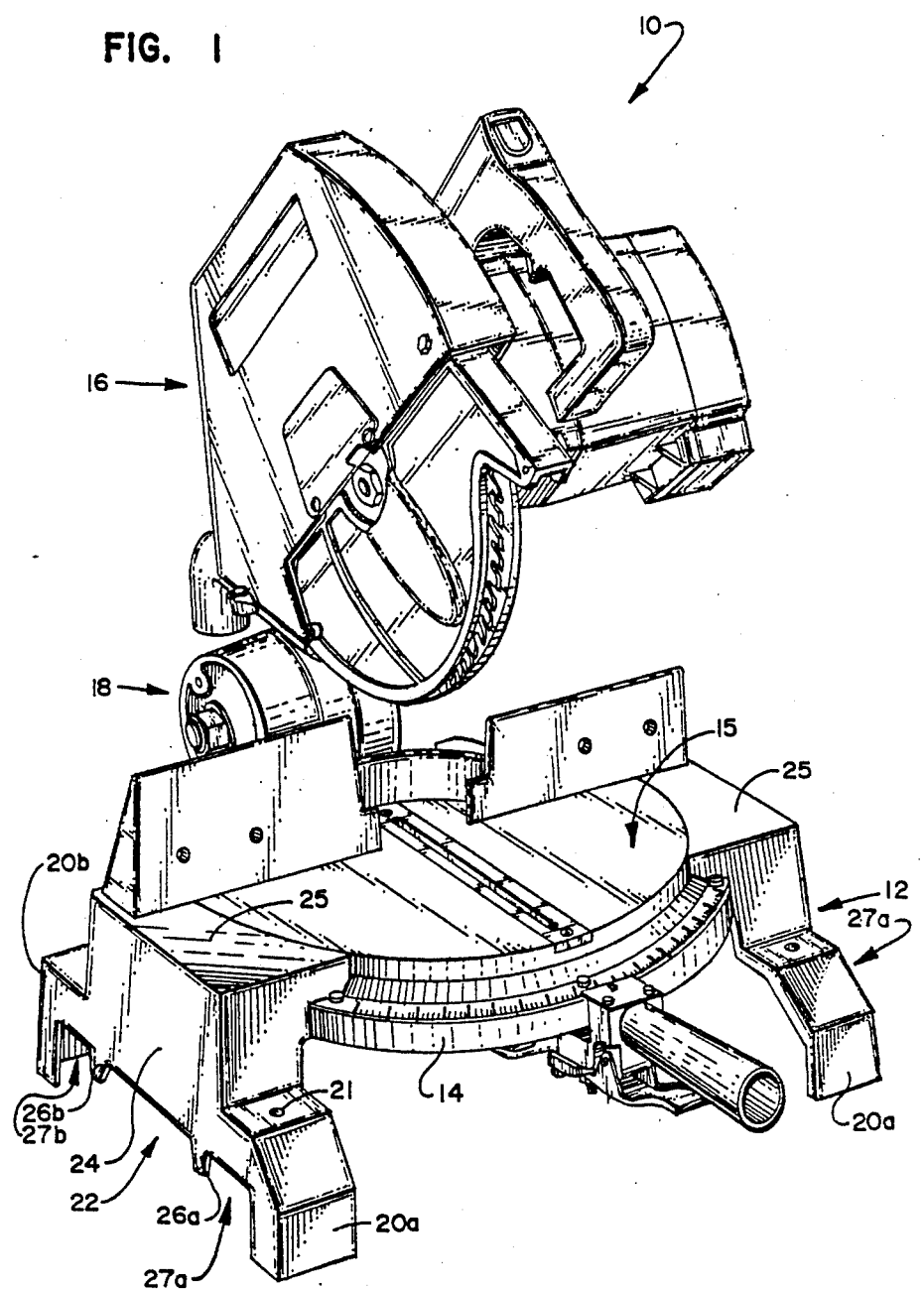

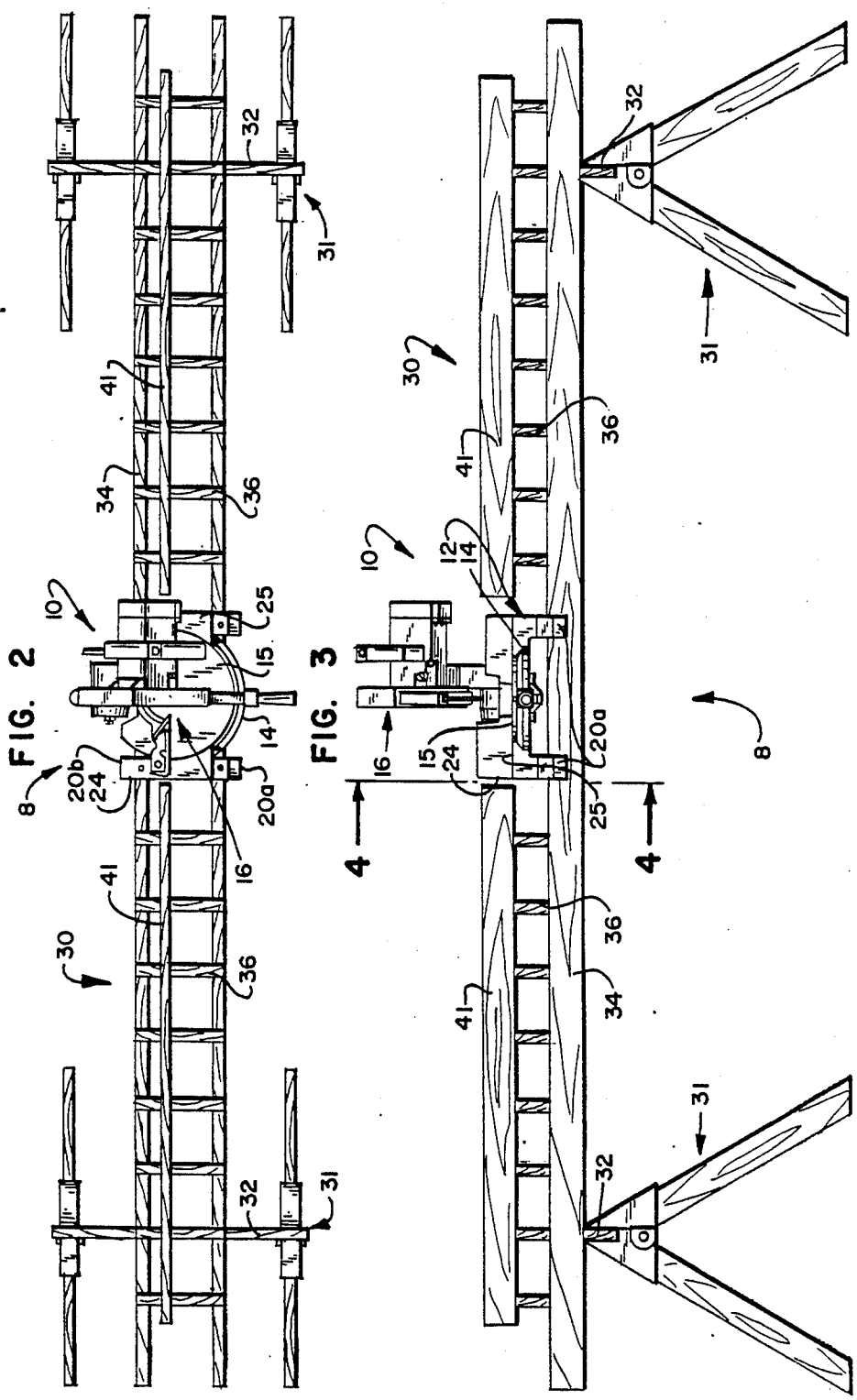

4,694,720

MITER BOX CONSTRUCTION

FIELD OF THE INVENTION

The invention relates generally to power tools, and more particularly to methods and means for supporting power tools to enhance their usefulness.

BACKGROUND OF THE INVENTION

Power tools, including power drills and saws of various types, have enjoyed widespread use. Electric power tools in particular are very popular. The present invention is directed generally to means for supporting power tools, and the invention will be discussed in terms of portable electrically-powered saws. It should be emphasized that the claims, not the following description, are indicative of the extent of the invention.

Several different types of portable electrically-powered saws are available, including (small) table saws, circular saws and power mitre boxes. By way of example, the remainder of this discussion will focus on means for supporting power mitre boxes. As emphasized above, however, the present invention is not limited to any particular type of power tool.

As is well known, a power mitre box is a mitre box and a circular saw, in combination. The saw is vertically hinged to a table which can horizontally swivel in relation to a base. The angle of the table to the base determines the angle of the cut. A power mitre box can be used by a carpenter to quickly and accurately cut molding, for example, for subsequent installation in a house. The entire power mitre box is typically approximately 18 inches tall and weighs approximately 35 to 55 pounds. And, power mitre boxes can cost anywhere from $130 to $500.

Continuing the carpenter example, the base of the power mitre box is typically simply set on the floor of the house under construction. It may also be nailed or screwed to the floor to increase its rigidity. In order to use a power mitre box sitting on the floor, however, the carpenter must stoop over or work on his knees. While this may not pose a problem to everyone, certainly older workers and those with back ailments are inconvenienced. And, although some power mitre boxes have straight handles which seem to accommodate "floor" use, preferred models have "D" type handles which render them most suitable for use at a comfortable height off of the floor.

To alleviate the problems associated with using a power mitre box which is resting directly on the floor, foldable stands have been proposed. In order for such stands to be sufficiently sturdy, however, they must be fairly heavy. This alone might not be a problem, but workmen often take their tools home at the end of a work day, to eliminate the risk of theft. In light of this common practice, the added burden of a costly, heavy and cumbersome power mitre box stand has not been well accepted by the trade.

In summary, the prior art does not provide a power mitre box supporting technique which rigidly positions the tool at a comfortable working height and which also accommodates the practice of removing tools and other items of value from the worksite at day's end.

In addition, the prior art fails to disclose means for supporting a power mitre box which meets the requirements given above and which also facilitates use of the power tool by supporting the workpiece, e.g., the piece of lumber being cut. Power mitre boxes are oftentimes used to cut very long pieces of lumber, and in such cases it is desirable that the portion(s) of the workpiece extending off of the mitre boxes be well supported to prevent splintering and blade binding.

The present invention is directed to the perceived shortcomings of prior art means and methods for supporting power tools, e.g., power mitre boxes. In particular, a preferred power mitre box embodiment of the invention, described below, accomplishes the following:

1. allows the tool to be raised to a comfortable working height;
2. provides a sturdy base for the tool;
3. eliminates the need for the workman to fold and remove a stand on a daily basis; and
4. facilitates workpiece support to limit splintering and blade binding.

SUMMARY OF THE INVENTION

Accordingly, the present invention broadly includes a portable power tool suitable for interconnection with a pair of horizontal support members positioned above a ground plane, including:

(a) an electrically-powered motor unit;
(b) base means operatively engaging the electrically-powered motor unit; and
(c) slot means in operative contact with the base means for engaging the pair of horizontal support members, whereby the portable power tool can be raised a comfortable height above the ground plane.

In a preferred embodiment, the portable power tool is a power mitre box.

Also, in preferred embodiments, the "horizontal support members" are standard dimension lumber rails, e.g., two-by-fours.

While the "slot means" referred to above can be anything which allows a portable power tool to be engaged with a pair of "horizontal support members", the "slot means" preferably includes a plurality of legs suitable for resting on the "ground plane" and an equal number of studs. Slots are formed by the legs and the studs, one each of the legs being associated with one each of the studs, and the slots receive the horizontal support members so as to support the portable power tool. Preferably, there are two front slots and two rear slots, with the two front slots receiving one of the rails and the two rails slots receiving the other rail.

In addition, the "horizontal support members" (e.g., the lumber rails which support the portable power tool) are preferably spanned by a plurality of cross pieces. The "base means" of the portable power tool preferably includes an "extension" which extends upward from the legs such that the top of the extension is flush with these cross pieces, whereby the cross pieces and the "extension" are suitable for supporting a work piece. Thus, blade binding and splintering are substantially eliminated.

The invention also includes, as an alternative embodiment, a power tool apparatus which includes a pair of horizontal support members and a portable power tool as discussed above. That is, one embodiment of the invention is a portable power tool which is suitable for interconnecting with a pair of support rails, and the other embodiment is a portable power tool and a pair of horizontal support members, in combination.

Finally, the present invention includes a method for supporting a portable power tool including:

(a) selecting a base for the portable power tool having a plurality of slots;
(b) securely engaging the slots with a pair of horizontal support rails; and
(c) positioning the rails such that the portable power tool is at a comfortable working height.

BRIEF DESCRIPTION OF THE DRAWING

The present invention will be further described with reference to the drawing in which:

FIG. 1 is a perspective view of a power mitre box constructed according to the present invention;

FIG. 2 is a top plan view of the power mitre box of FIG. 1 supported by a wooden stand, wherein a piece of lumber to be cut is being supported by the mitre box and the wooden stand;

FIG. 3 is a front elevational view of the power mitre box and stand of FIG. 2.

DETAILED DESCRIPTION OF A PREFERRED EMBODIMENT

Figure 4:
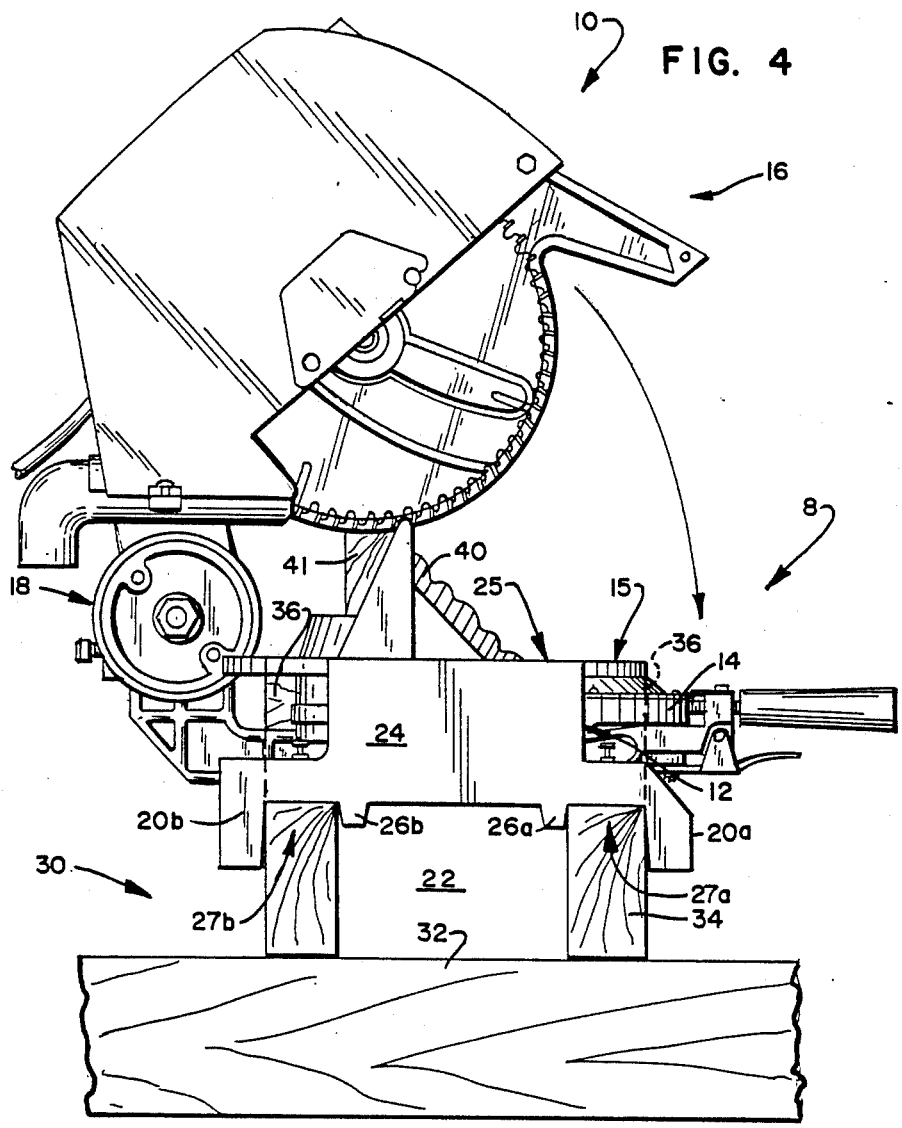
FIG. 4 is a side elevational view of the mitre box and a portion of the wooden stand shown in FIG. 2.

A preferred embodiment of the present invention will now be described with reference to the drawing, wherein like reference numerals represent like parts and assemblies throughout the several views. FIG. 1 illustrates a preferred power mitre box 10 constructed according to the invention. The power mitre box 10 includes as its basic components a base 12, a table 14 having a top surface 15 and an electrically-powered motor unit 16. Preferably, the table 14 horizontally swivels relative to the base 12 and the power saw 16 is vertically hinged to the table 14, wherein a torsional spring unit 18 interconnects the saw 16 and the table 14. As the present invention is primarily directed to the base 12 of power mitre box 10, the following description will focus on the base 12 and its use. Those skilled in the art will recognize that base 12 or other structures according to the invention could be used to support a wide variety of electrically-powered motor units, and not just the table and saw of a power mitre box.

Still referring to FIG. 1, base 12, preferably of cast iron construction, includes front and rear legs 20a and 20b, respectively, which permit the power mitre box 10 to sit on a planar surface, e.g., a floor, but it is preferable to engage the base 12 with a stand, described below. A horizontal slot 22 is formed by each associated pair of legs 20a and 20b, the horizontal slots 22 preferably being approximately 7 or 8 inches wide and approximately 1½ inches high. The horizontal slots 22 could be wider if greater tool stability is desired; by the same token, they should not be so narrow as to make the tool's "footprint" ineffectual.

Extending upward from each horizontal slot 22 and associated pair of legs 20a and 20b is a base extension 24 having a horizontal top 25 which is coplanar with the upper surface 15 of table 14. For reasons set forth below, the preferred distance from the top of each horizontal slot 22 to the top 25 of the corresponding base extension 24 is equal to either the width or thickness of a piece of standard dimension lumber, e.g., a two-by-four. As is well known, the width of a two-by-four is actually 3½ inches correspondingly; the height of extension 24 is preferably 3½ inches. Finally the height of extensions 24, in combination with the length of legs 20, should be sufficient to raise the table 14 off the floor to permit its free operation.

Extending downward into each horizontal slot 22 is a front tapered stud 26a and a rear tapered stud 26b such that each stud 26a or 26b is proximate an associated leg 20a or 20b, respectively. The distance from the outer (substantially vertical) edge of each stud 26 to the inner (substantially vertical) edge of the associated leg 20 preferably corresponds to the width or thickness of a piece of standard dimension lumber. The 1½ inch preferred distance corresponds to the actal thickness of nominal 2 inch thick lumber.

The studs 26 and legs 20 form stud/leg slots 27 suitable for receiving horizontal support members as further discussed below. The stud/leg slots 27a established by front legs 20a and front studs 26a (still referring to FIG. 1) are aligned and the rear stud/leg slots 27b created by rear legs 20b and rear studs 26b are similarly aligned. The table 14 is extended upward by extensions 24 such that none of its components hang down low enough to reach the stud/leg slots 27. In addition, atop each leg 20 is a hole 21 suitable for receiving a nail or screw; the power mitre box 10 can thus be optionally anchored to its stand (described below) or to the floor.

FIG. 4 illustrates, in partial view, the basic components of a simple but sturdy wooden stand 30 which can be used to raise the power mitre box 10 off of the floor. Stand 30 is so simple and inexpensive that it can safely be left at a worksite overnight. Further, as will be discussed below, stand 30 supports the lumber which is being cut to minimize splintering and blade binding. A fence extension 41 attached to the cross pieces 36 assists in handling long workpieces.

Referring to FIGS. 2-4, stand 30 can include a pair of lower horizontal supports 32, preferably the horizontal members of a pair of saw horses 31. Spanning the horizontal members 32 is a pair of horizontal rails 34 which could be two-by-fours or two-bysixes, for example, positioned such that their 1½ inch edges fit into the stud/leg slots 27 formed by studs 26a and legs 20; hence the desired 1½ inch width of the stud/leg slots. Finally, cross pieces 36 span and are supported by the rails 34. The cross pieces 36 are preferably two-by-fours laid on edge and toe nailed to the rails 34. As shown in FIGS. and 4, the tops of cross pieces 36 are preferably flush with the top surfaces 25 and 15 of extensions 24 and table 14, respectively. Of course, if the extensions 24 were 5½ inches long, the preferred cross pieces 36 would be two-by-sixes to maintain this flush top surface. It should be noted that more or fewer cross pieces 36 could be employed, depending on the type and length of lumber being cut. Thus, the stand 30 is preferably a ladder-like structure constructed from materials which are abundantly available at virtually every worksite.

FIGS. 2 and 3 show the power mitre box 10 and stand 30 fully assembled and ready to cut a large piece of lumber 40. Together, the power mitre box 10 and stand 30 form a rigidly-supported sawing device 8 capable of handling very long pieces of lumber. The reason for the flush relationship between the surfaces 15 and 25 and cross pieces 36 is evident: the cross pieces 36 support the lumber 40 as it is being cut so as to avoid splintering of lumber 40 and/or blade binding.

Upon completion of his work for the day, the carpenter can simply take the portable power mitre box 10 with him, leaving the bulky stand 30 behind. The bulkiness, heft and inexpensiveness of stand 30 make its theft very unlikely. The next day the carpenter simply sets the mitre box 10 on rails 34 and immediately begins cutting. Once the project is completed, the inexpensive stand 30 can be abandoned or knocked down for reassembly at the next site.

It should be emphasized that the present invention is not limited to any particular components, materials or configurations, and modifications of the invention will be apparent to those skilled in the art in light of the foregoing description. This description is intended to provide specific examples of individual embodiments which clearly disclose the present invention. Accordingly, the invention is not limited to these embodiments or to the use of elements having the specific configurations and shapes as presented herein. For example, it is not necessary that the stand 30 be constructed from wood; nor is it necessary that the base 12 have two stud/leg slots 27; and, the stand 30 could indeed be portable to some degree. All alternative modifications and variations of the present invention which fall within the spirit and broad scope of the appended claims are included.

I claim:

1. A portable power tool suitable for use in combination with horizontal support rails; said power tool comprising:
   (a) a motor unit;
   (b) base means operatively engaging the motor unit; and
   (c) slots means in operative contact with the base means and including a plurality of downwardly projecting legs and a plurality of downwardly projecting studs;
      (i) said legs being oriented to selectively support said base means upon a surface, if desired, and
      (ii) said legs and studs forming a plurality of rail slots, each slot being formed between a leg and an associated stud, said slots being oriented and arranged for engaging selected horizontal support rails;
   (d) whereby the portable power tool may selectively be raised a comfortable height above a ground plane.

2. The apparatus of claim 1, wherein the portable power tool comprises an electrically-powered sawing device.

3. The apparatus of claim 2, wherein the electrically-powered sawing device comprises a power mitre box.

4. The apparatus of claim 1, wherein the horizontal support members are standard dimension lumber rails and wherein the slots means forms a pair of slots suitable for receiving the rails.

5. The apparatus of claim 4, wherein the rails are two-by-fours.

6. The power tool according to claim 1 wherein:
   (a) said legs and studs are arranged to form slots suitable for engaging support rails comprising standard dimensions lumber rails.

7. A portable power tool suitable for interconnection with a pair of horizontal support members positioned above a ground plane, comprising:
   (a) an electrically-powered motor unit;
   (b) base means operatively engaging the electrically-powered motor unit; and
   (c) slot means in operative contact with the base means for engaging the pair of horizontal support members;
      (i) each of the horizontal support members being a standard dimension lumber two-by-four rail;
      (ii) said slot means forming a pair of slots suitable for receiving the rails; and
      (iii) said slot means comprising a plurality of legs suitable for resting on the ground plane, and an equal number of studs; the slots being formed by the legs and the studs, one each of the legs being associated with one each of the studs;
   (d) whereby the portable power tool can be raised a comfortable height above the ground plane.

8. The apparatus of claim 7, wherein the rails can support cross pieces and the base means comprises an extension extending upward from the legs such that its top surface is flush with cross pieces placed across the rails, whereby the cross pieces and the extension are suitable for supporting a workpiece.

9. A power tool apparatus, comprising:
   (a) a pair of horizontal support members positioned above a ground plane;
      (i) said horizontal support members each being a standard dimension lumber two-by-four rail; and,
   (b) a portable power tool comprising:
      (i) an electically-powered motor unit;
      (ii) base means for operatively engaging the electrically-powered motor unit;
      (iii) slots means in operative contact with the base means for engaging the pair of horizontal support members; said slot means forming a pair of slots suitable for receiving the rails and comprising a plurality of legs suitable for resting on the ground plane and an equal number of studs, wherein the slots are formed by the legs and the studs, one each of the legs being associated with one each of the studs;
   (c) whereby the portable power tool can be raised a comfortable height above the ground plane.

10. The apparatus of claim 9, wherein the portable power tool comprises an electrically-powered sawing device.

11. The apparatus of claim 9, wherein the rails can support cross pieces and the base means comprises an extension extending upward from the legs such that its top surface is flush with cross pieces placed across the rails, whereby the cross pieces and the extension are suitable for supporting a workpiece.

12. A power miter box apparatus comprising:
   (a) a pair of horizontal support members positioned above a ground plane; said horizontal support members having a plurality of cross pieces extending thereacross, said cross pieces having substantially co-planar tops;
   (b) a base comprising a vertical extension member;
   (c) a table horizontally rotatably connected to the base;
   (d) an electrically-powered motor unit vertically pivotably connected to the table;
   (e) two front legs extending downward from the front of the base and two rear legs extending downward from the rear of the base; and
   (f) four studs extending downward from the base, wherein four stud/leg slots are formed by one each of the legs in spaced relation to one each of the studs, two front stud/leg slots being formed by the two front legs and their associated studs, and two rear stud/leg slots being formed by the two rear legs and their associated studs; wherein the two front stud/leg slots are aligned to receive one of the horizontal support members and the two rear stud/leg slots are aligned to receive the other horizontal support member; and wherein the extension member extends vertically upward such that a top of the base and a top of the table are flush with the tops of the cross pieces; whereby the power miter box can be raised a convenient height above the ground and a workpiece can be supported by the flush surfaces of the cross pieces, base and table.

13. A portable power tool suitable for interconnection with a plurality of horizontal support members positioned above a ground plane, said tool comprising:
 (a) a motor unit;
 (b) base means operatively engaging the motor unit; and
 (c) slot means in operative contact with the base means for engaging the plurality of horizontal support members;
  (i) said slot means forming a plurality of slots suitable for receiving the horizontal support members when each horizontal support member is a standard dimension lumber two-by-four rail; and
  (ii) said slot means comprising a plurality of legs suitable for resting on the ground plane, and a plurality of studs; each of the slots being formed by a leg in association with a stud.

14. The apparatus substantially of claim 13, wherein the rails support cross pieces having co-planar top surfaces and the base means comprises an extension extending upward from the legs such that a top surface of the base means is flush with the cross pieces placed across the rails, whereby the cross pieces and the extension are suitable for supporting a workpiece.

15. A portable power tool suitable for interconnection with a plurality of horizontal support members positioned above a ground plane, said tool comprising:
 (a) a motor unit;
 (b) base means operatively engaging the motor unit; and
 (c) slot means in operative contact with the base means for engaging the plurality of horizontal support members;
  (i) said slot means forming a plurality of slots suitable for receiving the horizontal support members when each horizontal support member is a standard dimension lumber rail; and
  (ii) said slot means comprising a plurality of legs suitable for resting on the ground plane, and a plurality of studs; each of the slots being formed by a leg in association with a stud.

16. The apparatus of claim 15, wherein the rails support cross pieces having substantially co-planar top surfaces and the base means comprises an extension extending upward from the legs such that a top surface of the base means is flush with the cross pieces placed across the rails, whereby the cross pieces and the extension are suitable for supporting a workpiece.

17. A power tool apparatus comprising:
 (a) a plurality of horizontal support rails positioned above a ground plane; each support rail being a standard dimension lumber rail; and
 (b) a portable power tool including:
  (i) a motor unit;
  (ii) base means for operably engaging the motor unit;
  (iii) slot means including a plurality of slots constructed and arranged for receiving said rails, said slot means comprising a plurality of legs suitable for resting on the ground plane and a plurality of studs, wherein the plurality of slots is formed by said legs and said studs;
 (c) whereby the portable power tool can be raised a comfortable height above the ground plane.

18. The apparatus of claim 17, wherein the rails support cross pieces having substantially co-planar top surfaces and the base means comprises an extension extending upward from the legs such that a top surface of the base means is flush with the cross pieces placed across the rails, whereby the cross pieces and the extension are suitable for supporting a workpiece.

19. A power mitre box suitable for interconnection with a pair of parallel horizontal rails positioned above the ground, the rails carrying cross pieces, comprising:
 (a) a base comprising a vertical extension member;
 (b) a table horizontally rotatably connected to the base;
 (c) an electrically-powered motor unit vertically pivotably connected to the table;
 (d) two front legs extending downward from the front of the base and two rear legs extending downward from the rear of the base; and
 (e) four studs extending downward from the base, wherein four stud/leg slots are formed by one each of the legs in spaced relation to one each of the studs, two front stud/leg slots being formed by the two front legs and their associated studs, and two rear stud/leg slots being formed by the two rear legs and their associated studs; wherein the two front stud/leg slots are aligned to receive one of the rails and the two rear stud/leg slots are aligned to receive the other rail; and wherein the extension member extends vertically upward such that the top of the base and the top of the table are flush with the tops of the cross pieces; whereby the power mitre box can be raised a convenient height above the ground and a workpiece can be supported by the flush surfaces of the cross pieces, base and table.

20. A power miter box suitable for interconnection with a pair of horizontal rails positioned over a ground surface, the rails carrying cross pieces having substantially coplanar upper surfaces; said power miter box comprising:
 (a) a base having a pair of downwardly projecting front legs and a pair of downwardly projecting rear legs;
 (b) a table rotatably mounted on said base;
  (i) said table having a work surface;
 (c) a motor unit;
 (d) four studs extending downward from said base;
  (i) said studs forming four stud/leg slots, one each of said stud/leg slots being formed in association with each of said four legs, said four stud/leg slots comprising a pair of front stud/leg slots and a pair of rear stud/leg slots, said front stud/leg slots being aligned to receive a first of the horizontal rails and said rear stud/leg slots being aligned to receive a second of the horizontal rails; and
 (e) said base supporting said table with said work surface at a height substantially flush with the top surfaces of the cross pieces on the rails;
 (f) whereby said power miter box may be selectively raised a convenient height above the ground and a workpiece may be selectively supported by said table work surface and the cross pieces.

21. A power miter box apparatus comprising:
 (a) a pair of horizontal support members positioned above a ground plane;

(i) said support members having a plurality of cross pieces extending therebetween, said cross pieces having substantially co-planar upper surfaces;
(b) a base having a plurality of downwardly projecting front legs and a plurality of downwardly projecting rear legs;
(c) a table rotatably mounted on said base, said table having an upper work surface;
(d) at least four studs extending downwardly from said base, said studs including a front pair of studs and a rear pair of studs;
 (i) each of said front pair of studs forming a stud/leg slot with one of said base front legs to form two front stud/leg slots;
 (ii) each of said rear pair of studs forming a stud/leg slots with one of said base rear legs to form two rear stud/leg slots;
 (iii) said two front stud/leg slots being aligned to receive a first one of said horizontal support members and said two rear stud/leg slots being aligned to receive a second one of said horizontal support members;
(e) said base supporting said table work surface in a plane substantially co-planar with said cross piece upper surfaces;
(f) whereby the miter box may selectively be positioned a convenient height above the ground; and
(g) whereby a workpiece may be supported by the table work surface and the cross pieces.

22. A method of supporting a portable power tool, said method including the steps of:
(a) providing a power tool having a base and a motor unit;
 (i) said step of providing a power tool including providing a tool with a base having a plurality of downwardly projecting front legs and a plurality of downwardly projecting rear legs;
 (ii) said step of providing a power tool further including providing a tool with a base having at least four downwardly projecting studs thereon, a first pair of said studs forming a pair of first stud/leg slots with two of said front legs, and a second pair of said studs forming a pair of rear stud/leg slots with two of said rear legs;
(b) providing a front rail engageable with said front slots;
(c) providing a rear rail engageable with said rear slots;
(d) positioning said front and rear rails substantially horizontally over a surface; and
(e) placing said power tool on said front and rear rails with said front rail-engaging said front slots and said rear rail engaging said rear slots.

23. A method of supporting a portable power tool, said method including the steps of:
(a) providing a base of the power tool with a plurality of downwardly projecting front legs, rear legs and at least four studs;
 (i) said step of providing said base with studs including providing a first pair of studs forming a front pair of stud/leg slots with two of said front legs;
 (ii) said step of providing said base with studs further including providing a second pair of studs forming a rear pair of stud/leg slots with two of said rear legs;
(b) providing a front rail engageable with said front slots;
(c) providing a rear rail engageable with said rear slots;
(d) positioning said front and rear rails substantially horizontally over a floor surface; and
(e) placing said power tool on said front and rear rails with said front rail engaging said front slots and said rear rail engaging said rear slots.

24. The method according to claim 23 wherein:
(a) said step including formation of said front stud/leg slots includes forming front stud/leg slots sized to receive as a rail a standard sized extension of lumber; and
(b) said step including formation of said rear stud/leg slots includes forming rear stud/leg slots sized to receive as a rail a standard sized extension of lumber.

* * * * *

UNITED STATES PATENT AND TRADEMARK OFFICE
CERTIFICATE OF CORRECTION

PATENT NO. : 4,694,720

DATED : September 22, 1987

INVENTOR(S) : Louis C. Brickner, Jr.; Jerry D. Skipworth

It is certified that error appears in the above-identified patent and that said Letters Patent are hereby corrected as shown below:

Column 4, line 38, delete "26a" and insert --26--.

Column 4, line 43, before "and" insert --3--.

Column 5, line 55, delete "dimensions" and insert --dimension--.

Column 6, line 21, delete "electically" and insert --electrically--.

Column 9, line 42, delete "first" (2nd occurrence) and insert --front--.

Signed and Sealed this

Ninth Day of February, 1988

Attest:

DONALD J. QUIGG

Attesting Officer

Commissioner of Patents and Trademarks